Nov. 17, 1953   L. V. DUTRO ET AL   2,659,436
SHEAR ASSEMBLY
Filed Aug. 22, 1950

INVENTOR.
LYLE V. DUTRO
JAMES F. NAMETH
BY
Mellin and Hanson
ATTORNEYS

Patented Nov. 17, 1953

2,659,436

UNITED STATES PATENT OFFICE 2,659,436

SHEAR ASSEMBLY

Lyle V. Dutro, La Canada, and James F. Nameth, Los Angeles, Calif., assignors to The McBee Company, Athens, Ohio, a corporation Application August 22, 1950, Serial No. 180,834

5 Claims. (Cl. 164—60)

This invention relates to a shear assembly. More particularly it relates to a shearing machine which is operable to slit and turn a continuously moving web along longitudinal lines into strips of precise dimensions, which can then be sheared transversely into individual cards of uniform shape and size.

In our copending application entitled Press, Serial No. 180,832, filed August 22, 1950, there is described a machine capable of receiving a continuous, rapidly moving web having record cards printed thereon, such as the well-known "Keysort" cards; numbering the cards serially at a numbering station; punching the cards at a piercing station to produce marginal perforations arranged in fields corresponding to "units," "tens," etc.; notching the numbered, perforated cards at a notching station to code the same serial numbers on the cards by means of marginal notches, and shearing the web longitudinally and then transversely at a shearing station to produce individual cards of precise dimensions.

This invention relates to the longitudinal shearing mechanism or assembly of the said machine, and it has for one of its objects the provision of a shearing mechanism capable of operation on a web of the character described, to produce individual cards of precise dimensions, and which is capable of operation at high speeds.

It is a further object of the present invention to provide a shearing machine capable of accurately slitting and trimming a rapidly and continuously moving web and which is provided with means for rapid and accurate alignment of the operating members.

It is yet another object of the present invention to provide a shearing machine of the character described in which the operating members can be easily removed from the frame of the machine for repairs and replacement.

These and other objects of the invention will be apparent from the ensuing description and the appended claims.

One form which the invention may assume is exemplified in the following description and illustrated by way of example in the accompanying drawings in which.

Figure 1:
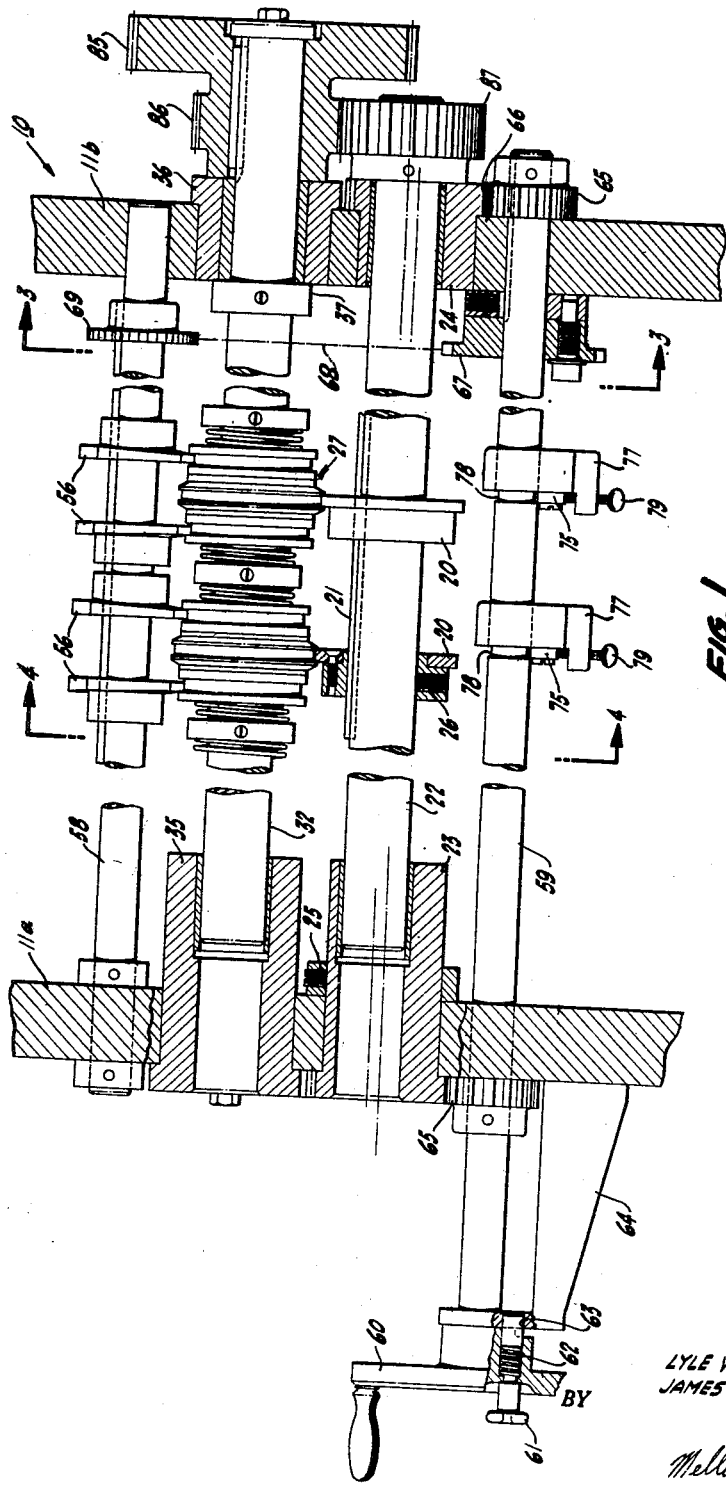
Figure 1 is a view taken in vertical section through the frame of the machine showing the shear assembly in end elevation.
Figure 3:
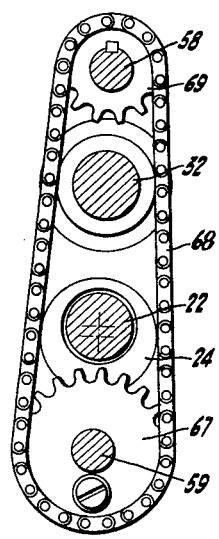
Figure 4:
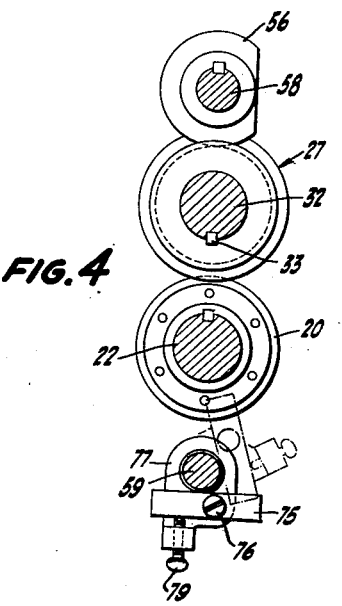

Figures 3 and 4 are sections taken along the lines 3—3 and 4—4 respectively of Figure 1.

Figure 5:
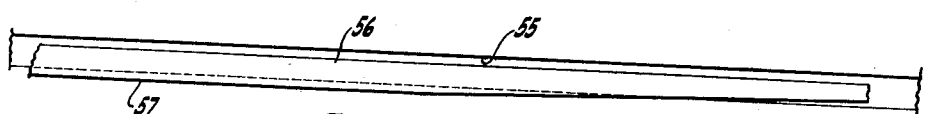

Figure 5 is a development of one of the cams employed for retracting the shears of Figure 1.

Figure 2:
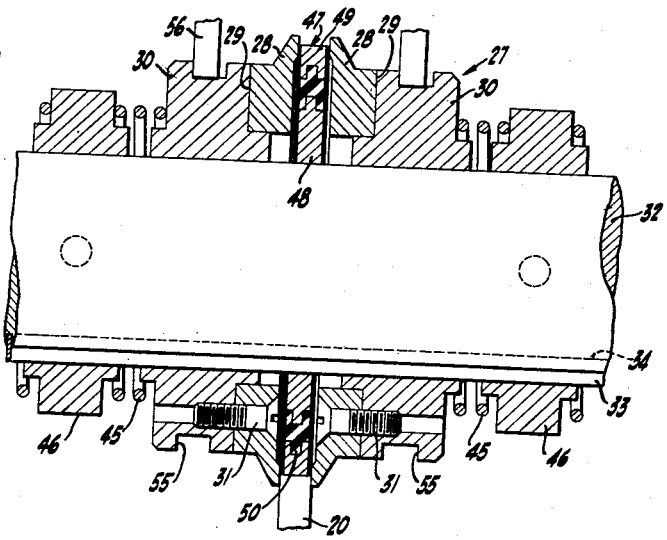
Figure 2 is a fragmentary longitudinal section, on a larger scale, taken through one of the shears of Figure 1.

Referring now to the drawings and more particularly to Figure 1, the machine as a whole is indicated as 10 and it is provided with a frame including side plates 11a and 11b. A plurality of rotatable shearing dies or gauging members 20 are keyed at 21 to a splined shaft 22 which is journaled at its ends in eccentric bushings 23 and 24. The bushings 23 and 24 are clamped in adjusted position by means of set screws 25. The shearing dies 20 are clamped in adjusted position by means of set screws 26 and there will, of course, be as many of the dies 20 as there are waste strips to be cut from the web. An upper shear assembly 27 is provided and, as is best shown in Figure 2, it comprises a pair of annular blades 28 for each of the shearing dies 20, and each of the blades 28 is seated in an annular recess 29 formed in a collar 30 and is clamped to its collar by means of screws 31. The shearing dies 20 constitute circular cutters or knives rotatable in association with the blades 28 for cutting web material moved therebetween, and also serving as gauge means for spacing the blades 28 to conform to the width of the dies and abut against the sides thereof for shearing a strip from the web.

The collars 30 are slidably but nonrotatably mounted on a shaft 32 by means of a key 33 and keyway 34. The shaft 32 is journaled in bushings 35 and 36 (see Fig. 1) and is clamped in position by means of a collar 37. Each pair of collars 30 and blades 28 are urged inwardly toward one another by means of expansion springs 45 each of which is compressed between a collar 30 and another collar 46 clamped to the shaft 32. Between each pair of blades 28 is disposed a disc 47 comprising a central portion 48, an outer annular portion 49 and an annular rubber cushion 50 disposed between the inner and outer portions. The collars 30 are formed with annular grooves 55 to receive cams 56 each of which has a cam surface 57 as illustrated in Figure 5. The cams 56 are mounted on a splined shaft 58 which is journaled in the side plates 11a and 11b. The function and purpose of the cams 56 will be explained hereinafter.

Means are provided for separating the shearing dies 20 from the blades 28 and for spreading the blades apart to permit access to the blades for purposes of inspection, repair and replacement, and means are also provided for accurate alignment of the blades. Such means will now be described.

Referring to Figure 1, a shaft 59 is provided which is journaled in the side plates of the machine and is provided at one end with a crank 60. A retractable pin 61 is provided which is urged inwardly by means of a spring 62 so as to seat its inner end in a socket 63 formed in the outer end of a bracket 64. The pin 61 serves the purpose of locking the crank 60 in the up position as shown. Gears 65 are fixed to the shaft 59 and mesh with gears 66 fixed to the eccentric bushings 23 and 24. It will therefore be apparent that, when the crank 60 is turned from the up position, the eccentric bushings 23 and 24 will be rotated and the shaft 22 will be lowered from its up position as shown in Figure 1 in which the dies 20 are in operative engagement with the blades 28. By this means a separation of the blades 28 and the dies 20 is achieved for the purpose indicated above.

As is also shown a sprocket 67 is clamped to the shaft 59 and is connected through the medium of a chain 68 to a sprocket 69 which is clamped to the shaft 58. It will therefore be apparent that rotation of the crank 60 will also rotate the shaft 58 and with it the cams 56. The profile of the cams 56 is such that when the crank 60 is rotated to separate the dies 20 from the blades 28, the cams 56 will spread the blades 28 apart against the force of expansion springs 45. The locking pin 61 will then be seated in an appropriate recess (not shown) similar to the recess 63, to lock the shaft 59 and the various parts actuated thereby in their appropriate positions during such time that is desired to inspect and repair the shear assembly.

Proper alignment of the dies 20 and blades 28 is accomplished by means of alignment blocks 75 which are fixed at 76 to collar 77. Each collar 77 is rotatable on the shaft 59, and each block 75 rides in and is guided by an annular groove 78 formed in the shaft 59. When it is desired to align the dies 20, the collars 77 are rotated in counter-clockwise direction as viewed in Fig. 4 until the blocks 75 are in the up position, and they are clamped in that position by means of set screws 79. The dies 20 are then adjusted to bring them flush against the blocks 75 and are clamped in adjusted position. Thereafter, the set screws 79 are released to allow the blocks 75 to drop clear of the dies 20.

Driving means for the machine is provided by a gear 85 keyed to the shaft 32 and a gear 86 formed on the hub of gear 85 and meshing with a gear 87 fixed to the shaft 22. The gear 85 may be driven by any suitable means (not shown).

It will be apparent, of course, that suitable driving rollers and guide roller will be provided for feeding the web to and taking it from the machine and that any suitable cross cutter may be employed to slit the web transversely after it has left the machine, to thereby sever individual cards.

It will thus be apparent that a shearing assembly is provided which is operable to shear and trim a rapidly and continuously moving web along longitudinal lines. Means are provided for accurate and rapid alignment of the operating parts of the machine, and merely by rotating a crank and loosening a few clamping members those parts which are subject to wear can be easily and rapidly removed and replaced.

While we have shown the preferred form of our invention, it is to be understood that various changes may be made therein by those skilled in the art without departing from the spirit of the invention as defined in the appended claims.

Having thus described our invention, what we claim and desire to secure by Letters Patent is:

1. An apparatus of the class described for slitting and trimming a continuously moving web, comprising a frame, a shaft rotatably supported by the frame, a pair of knives slidably but non-rotatably mounted on said shaft and being spring-urged toward one another, a second shaft on the frame arranged parallel to the first-named shaft and carrying a third circular knife having its periphery normally disposed between the pair of knives in yielding engagement therewith, means for adjustably securing said third knife to its shaft axially therealong, eccentric means mounted in the frame and rotatably supporting said second shaft, operable when actuated to bodily displace the third knife from its normal cutting position, in a direction at angles to the axes of rotation of the knives, a gauge for determining the location of said third knife along the second shaft, said gauge being rotatably mounted on the frame and normally being disposed in an inoperative position but adapted when rotated to be swung to an operated gauging position, means operable when actuated for axially separating the pair of knives, and actuating means for actuating the last-named means to cause an axial separation of said pair of knives, and substantially simultaneously actuating the eccentric means to cause a displacement of the third knife from its cutting position, and for substantially simultaneously actuating the gauge to bring the same into its gauging position to enable an adjustment, when necessary, of the third knife along its shaft to be made.

2. An apparatus of the class described for slitting and trimming a continuously moving web, comprising a frame, a shaft rotatably supported by the frame, a pair of knives slidably but non-rotatably mounted on said shaft and being spring-urged toward one another, a second shaft on the frame arranged parallel to the first-named shaft and carrying a third circular knife having its periphery normally disposed between the pair of knives in yielding engagement therewith, means for adjustably securing said third knife to its shaft axially therealong, eccentric means mounted in the frame and rotatably supporting said second shaft, operable when actuated to bodily displace the third knife from its normal cutting position, in a direction at angles to the axes of rotation of the knives, a gauge for determining the location of said third knife along the second shaft, said gauge being rotatably mounted on the frame and normally being disposed in an inoperative position but adapted when rotated to be swung to an operated gauging position, means operable when actuated for axially separating the pair of knives, the last-named means including cams adapted when actuated to force the pair of knives away from one another, and actuating means for actuating the cams to cause an axial separation of said pair of knives, and substantially simultaneously actuating the eccentric means to cause displacement of the third knife from its cutting position, and for substantially simultaneously actuating the gauge to bring the same into its gauging position to enable an adjustment, when necessary, of the position of said third knife along its shaft to be made.

3. An apparatus of the class described for slitting and trimming a continuously moving web, comprising a frame, a shaft rotatably supported by the frame, a pair of knives slidably but non-rotatably mounted on said shaft and being spring-urged toward one another, a second shaft on the frame arranged parallel to the first-named shaft and carrying a third circular knife having its periphery normally disposed between the pair of knives in yielding engagement therewith, means for adjustably securing said third knife to its shaft axially therealong, eccentric means mounted in the frame and rotatably supporting said second shaft, operable when actuated to bodily displace the third knife from its normal cutting position, in a direction at angles to the axes of rotation of the knives, a gauge for determining the location of said third knife along the second shaft, said gauge being rotatably mounted on the frame and normally being disposed in an inoperative position but adapted when rotated to be swung to an operated gauging position, means operable when actuated for axially separating the pair of knives, the last-named means including cams adapted when actuated to force the pair of knives away from one another, and actuating means for actuating the cams to cause an axial separation of said pair of knives, and substantially simultaneously actuating the eccentric means to cause displacement of the third knife from its cutting position, and for substantially simultaneously actuating the gauge to bring the same into its gauging position to enable an adjustment, when necessary, of the position of said third knife along its shaft to be made, said actuating means including a shaft on which the gauge is mounted, a drive from the last-named shaft to the eccentric means and to the cams, and manual means for rotating said last-named shaft.

4. An apparatus of the class described for slitting and trimming a continuously moving web, comprising a frame, a shaft rotatably supported by the frame, a pair of knives slidably but non-rotatably mounted on said shaft and being spring-urged toward one another, a second shaft on the frame arranged parallel to the first-named shaft and carrying a third circular knife having its periphery normally disposed between the pair of knives in yielding engagement therewith, means for adjustably securing said third knife to its shaft axially therealong, eccentric means mounted in the frame and rotatably supporting said second shaft, operable when actuated to bodily displace the third knife from its normal cutting position, in a direction at angles to the axes of rotation of the knives, a gauge for determining the location of said third knife along the second shaft, said gauge being rotatably mounted on the frame and normally being disposed in an inoperative position but adapted when rotated to be swung to an operated gauging position, means operable when actuated for axially separating the pair of knives, the last-named means including a rotating cam for each knife of the pair of knives fitting within a groove formed in the knife, and actuating means for actuating the cams to cause an axial separation of said pair of knives, and substantially simultaneously actuating the eccentric means to cause displacement of the third knife from its cutting position, and for substantially simultaneously actuating the gauge to bring the same into its gauging position to enable an adjustment of the position of said third knife along its shaft to be made, said actuating means including a shaft on which the gauge is mounted, a drive from the last-named shaft to the eccentric means and to the cams, and manual means for rotating said last-named shaft.

5. An apparatus of the class described for slitting and trimming a continuously moving web, comprising a frame, a shaft rotatably supported by the frame, a pair of knives slidably but non-rotatably mounted on said shaft and being spring-urged toward one another, a second shaft on the frame arranged parallel to the first-named shaft and carrying a third circular knife having its periphery normally disposed between the pair of knives in yielding engagement therewith, eccentric means mounted in the frame and rotatably supporting said second shaft, operable when actuated to bodily displace the third knife from its normal cutting position, in a direction at angles to the axes of rotation of the knives, means operable when actuated for axially separating the pair of knives, and actuating means for actuating the last-named means to cause an axial separation of said pair of knives, and substantially simultaneously actuating the eccentric means to cause a displacement of the third knife from its cutting position.

LYLE V. DUTRO.
JAMES F. NAMETH.

References Cited in the file of this patent

UNITED STATES PATENTS

| Number | Name | Date |
|---|---|---|
| 393,535 | Browne | Nov. 27, 1888 |
| 801,036 | McCorkindale | Oct. 3, 1905 |
| 1,490,691 | Beynon | Apr. 15, 1924 |
| 1,759,842 | Fossa | May 27, 1930 |
| 1,820,033 | Roebling | Aug. 25, 1931 |
| 2,270,929 | Bugg | Jan. 27, 1942 |

FOREIGN PATENTS

| Number | Country | Date |
|---|---|---|
| 149,499 | Great Britain | Aug. 19, 1920 |